(12) United States Patent
Kobayashi et al.

(10) Patent No.: US 11,783,701 B2
(45) Date of Patent: Oct. 10, 2023

(54) COMMUNICATION CONTROL APPARATUS, COMMUNICATION SYSTEM, COMMUNICATION CONTROL METHOD, AND NON-TRANSITORY COMPUTER-READABLE MEDIUM

(71) Applicant: NEC Corporation, Tokyo (JP)

(72) Inventors: Kosei Kobayashi, Tokyo (JP); Sweety Suman, Tokyo (JP); Takanori Iwai, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 17/426,746

(22) PCT Filed: Jan. 16, 2020

(86) PCT No.: PCT/JP2020/001305
§ 371 (c)(1),
(2) Date: Jul. 29, 2021

(87) PCT Pub. No.: WO2020/158421
PCT Pub. Date: Aug. 6, 2020

(65) Prior Publication Data
US 2022/0101725 A1 Mar. 31, 2022

(30) Foreign Application Priority Data
Jan. 31, 2019 (JP) .................................. 2019-015598

(51) Int. Cl.
*G08G 1/052* (2006.01)
*G08G 1/017* (2006.01)
(Continued)

(52) U.S. Cl.
CPC ............. *G08G 1/052* (2013.01); *G08G 1/017* (2013.01); *G08G 1/09* (2013.01); *G08G 1/13* (2013.01); *G08G 1/16* (2013.01)

(58) Field of Classification Search
CPC .......... G08G 1/052; G08G 1/017; G08G 1/09; G08G 1/13; G08G 1/16
See application file for complete search history.

(56) References Cited

U.S. PATENT DOCUMENTS

| 2013/0093895 A1* | 4/2013 | Palmer ..................... G08G 1/04 348/149 |
| 2017/0094614 A1 | 3/2017 | Tosa et al. |

(Continued)

FOREIGN PATENT DOCUMENTS

| JP | H1019591 A | 1/1998 |
| JP | 11305836 A * | 11/1999 |

(Continued)

OTHER PUBLICATIONS

International Search Report for PCT Application No. PCT/JP2020/001305, dated Feb. 10, 2020.

*Primary Examiner* — Mohamed Barakat
(74) *Attorney, Agent, or Firm* — Sughrue Mion, PLLC

(57) ABSTRACT

A communication control apparatus (10) according to the present disclosure includes a communication unit (11) communicating information to and from a moving body, a violation time predicting unit (12) predicting a violation time at which the moving body violates a constraint condition relating to a relative relationship between the moving body and another object or a constraint condition relating to a relative relationship between the moving body and a path on which the moving body should run by using positional information of the moving body, a deadline calculating unit (13) calculating an execution deadline of an avoidance operation for avoiding a violation of the constraint condition (Continued)

by using the violation time, and a communication control unit (14) increasing a priority level of a communication with the moving body as a time difference between a current time and the execution deadline decreases.

9 Claims, 13 Drawing Sheets

(51) Int. Cl.
  *G08G 1/09* (2006.01)
  *G08G 1/13* (2006.01)
  *G08G 1/16* (2006.01)

(56) References Cited

U.S. PATENT DOCUMENTS

| | | | |
|---|---|---|---|
| 2018/0032079 A1* | 2/2018 | Nishi | G08G 1/16 |
| 2018/0260253 A1* | 9/2018 | Nanda | G06F 11/3476 |
| 2019/0100207 A1* | 4/2019 | Maruyama | B60W 10/107 |

FOREIGN PATENT DOCUMENTS

| | | | |
|---|---|---|---|
| JP | H11305836 A | | 11/1999 |
| JP | 2005032010 A | * | 2/2005 |
| JP | 2005032010 A | | 2/2005 |
| JP | 2009211397 A | | 9/2009 |
| JP | 2010162994 A | * | 7/2010 |
| JP | 2010162994 A | | 7/2010 |
| JP | 2010241315 A | | 10/2010 |
| JP | 5330063 B2 | * | 10/2013 |
| JP | 2017068398 A | | 4/2017 |
| JP | 2017210171 A | | 11/2017 |

\* cited by examiner

COMMUNICATION CONTROL APPARATUS, COMMUNICATION SYSTEM, COMMUNICATION CONTROL METHOD, AND NON-TRANSITORY COMPUTER-READABLE MEDIUM

This application is a National Stage Entry of PCT/JP2020/001305 filed on Jan. 16, 2020, which claims priority from Japanese Patent Application 2019-015598 filed on Jan. 31, 2019, the contents of all of which are incorporated herein by reference, in their entirety.

TECHNICAL FIELD

The present disclosure relates to a communication control apparatus, a communication system, and a communication control method.

BACKGROUND ART

In recent years, automation of conveyance works using an automatic guided vehicle (AGV) has been advanced. By automating works of conveying loads, efficiency of works within, for example, a factory or a warehouse can be increased. In order for AGVs to run at a high speed and smoothly without causing a delay or a collision, each of the AGVs is required to share information on positions, speeds and so on in real time. Wireless communication is mainly used as means for sharing information in real time by each of AGVs.

Patent Literature 1 discloses a configuration of a communication apparatus that calculates a relative relationship between a vehicle having the communication apparatus and a neighboring vehicle and computes a change in relative position during a time period from a current time to a time after a specified period. Furthermore, Patent Literature 1 discloses that, if a risk of collision exists between the vehicle having the communication apparatus and a neighboring vehicle as a result of a change in relative position, each of the vehicles increases its communication power and transmits data such as positional information. By increasing the communication power, improvement of communication quality of high-emergency-degree data is realized.

CITATION LIST

Patent Literature

[Patent Literature 1] Japanese Unexamined Patent Application Publication No. 2017-068398

SUMMARY OF INVENTION

Technical Problem

However, in Patent Literature 1, execution of a collision avoidance operation in each of vehicles is not considered. As a result, a problem of the communication apparatus in Patent Literature 1 is that it cannot predict an execution deadline of a collision avoidance operation and that communication required for collision avoidance cannot be completed until the execution deadline of the collision avoidance operation. In other words, a problem of the communication apparatus in Patent Literature 1 is that efficient communication control for collision avoidance cannot be performed.

It is an object of the present disclosure to provide a communication control apparatus, a communication system, and a communication control method by which efficient communication control can be performed.

Solution to Problem

A communication control apparatus according to one aspect of the present disclosure includes a communication unit receiving positional information from a running moving body, a violation time predicting unit predicting a violation time at which the moving body violates a constraint condition relating to a relative relationship between the moving body and another object or a constraint condition relating to a relative relationship between the moving body and a path on which the moving body should run by using the positional information, a deadline calculating unit calculating an execution deadline of an avoidance operation for causing the moving body to avoid a violation of the constraint condition by using the violation time, and a communication control unit increasing radio resource to be allocated to the moving body as a time difference between a current time and the execution deadline decreases.

A communication system according to a second aspect of the present disclosure includes a communication control apparatus having a communication unit receiving positional information from a running moving body, a violation time predicting unit predicting a violation time at which the moving body violates a constraint condition relating to a relative relationship between the moving body and another object or a constraint condition relating to a relative relationship between the moving body and a path on which the moving body should run by using the positional information, and a deadline calculating unit calculating an execution deadline of an avoidance operation for causing the moving body to avoid a violation of the constraint condition by using the violation time, the communication unit transmitting the execution deadline to the running moving body, and a moving body having a communication unit receiving the execution deadline and a communication control unit increasing radio resource to be used for a communication with the communication control apparatus as a time difference between a current time and the execution deadline decreases.

A radio resource control method according to a third aspect of the present disclosure includes receiving positional information from a running moving body, predicting a violation time at which the moving body violates a constraint condition relating to a relative relationship between the moving body and another object or a constraint condition relating to a relative relationship between the moving body and a path on which the moving body should run by using the positional information, calculating an execution deadline of an avoidance operation for causing the moving body to avoid a violation of the constraint condition by using the violation time, and increasing radio resource to be allocated to the moving body as a time difference between a current time and the execution deadline decreases.

Advantageous Effects of Invention

According to the present disclosure, a communication control apparatus, a communication system, and a communication control method by which efficient communication control can be performed can be provided.

DESCRIPTION OF EMBODIMENTS

First Example Embodiment

Figure 1:
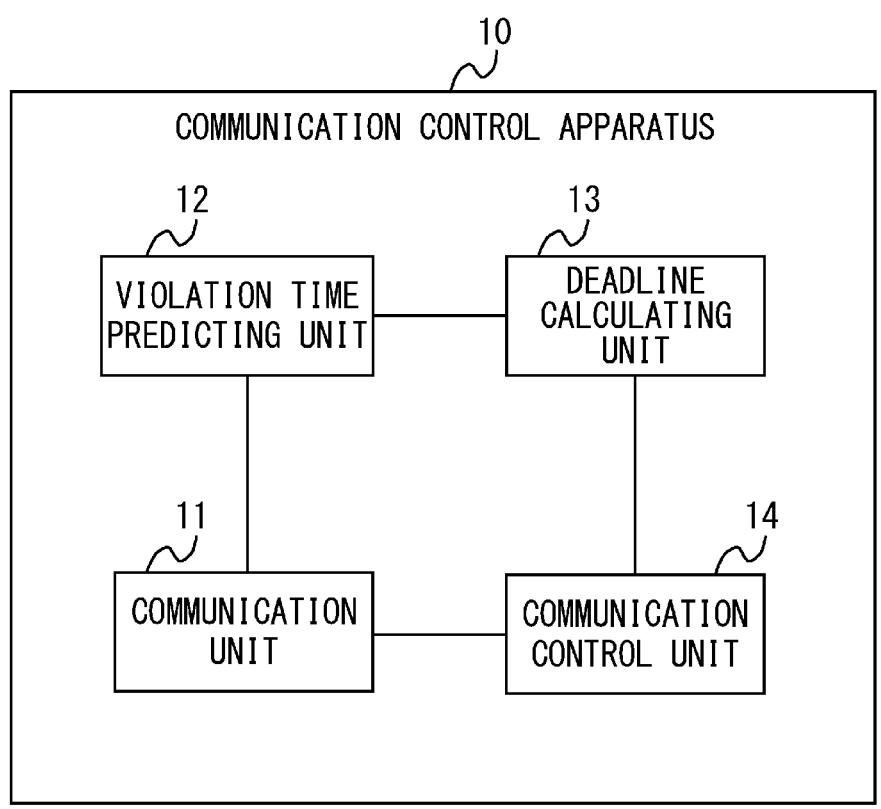
FIG. 1 is a configuration diagram of a communication control apparatus according to a first example embodiment.

Example Embodiments of the present disclosure are described below with reference to drawings. A configuration example of a communication control apparatus 10 according to a first example embodiment is described with reference to FIG. 1. The communication control apparatus 10 in FIG. 1 may be a computer apparatus that is caused to operate by a program stored in a memory and executed by a processor.

The communication control apparatus 10 includes a communication unit 11, a violation time predicting unit 12, a deadline calculating unit 13, and a communication control unit 14. The components of the communication control apparatus 10 such as the communication unit 11, the violation time predicting unit 12, the deadline calculating unit 13 and the communication control unit 14 may be software or modules the processing of which is executed by a program stored in a memory and executed by a processor. Alternatively, the components of the communication control apparatus 10 may be hardware such as a circuit or a chip.

The communication unit 11 communicates information to and from a moving body. The moving body may be transportation means such as a vehicle including an automobile, a train, construction equipment, automated guided vehicle (AGV) and so on, a manned aerial vehicle, an unmanned aerial vehicle (UAV), and a ship. The communication unit 11 may receive information from a running moving body via a wireless communication line. The wireless communication line may be, for example, a mobile network such as 3G, 4G, Long Term Evolution (LTE) or 5G, the specifications of which are provided by 3rd Generation Partnership Project (3GPP) or a wireless local area network (LAN). The wireless communication line may be a PS-LTE or a private LTE that can be constructed without requiring a license therefor.

The moving body may transmit information regarding, for example, a current time and a position of the moving body to the communication control apparatus 10. Also, the moving body may transmit, to the communication control apparatus 10, information that can be acquired or calculated by various sensors mounted in the moving body, such as a running speed, an acceleration, a temperature, a battery remaining amount, information (position, shape, kind and the like) of a human or an object existing around the moving body. Also, the moving body may transmit, to the communication control apparatus 10, information for checking an execution state of a task by the moving body and the soundness or abnormality of hardware or software of the moving body.

Here, a position of the moving body may be calculated by using a global navigation satellite system (GNSS) such as a global positioning system (GPS). Alternatively, a position of the moving body may be calculated by recognizing a marker provided on a floor or a ceiling by the moving body. Alternatively, a current position of the moving body may be calculated by calculating a direction of movement and an amount of movement by using a gyro sensor and an acceleration sensor and integrating the direction of movement and the amount of movement. Alternatively, a position of the moving body may be calculated by using simultaneous localization and mapping (SLAM). It should be noted that a position of the moving body may be calculated by combining two or more of the above-described methods.

The communication control apparatus 10 may transmit, to the moving body, for example, information regarding an instruction of a moving body control such as a deceleration, an acceleration, a turn, or the like, information on an objective point for which the moving body should head, and information regarding a human, an object or another moving body existing around the moving body. These kinds of information may be transmitted by the communication control apparatus 10 itself, or the communication control apparatus 10 may relay such information from another device.

By using the positional information, the violation time predicting unit 12 predicts a violation time at which the moving body violates a constraint condition relating to a relative relationship between the moving body and another object or a constraint condition relating to a relative relationship between the moving body and a path on which the moving body should run. The term "another object" may refer to another moving body or a human, a structure or the like. The constraint condition is a condition to be satisfied by the moving body with respect to another object or by the moving body with respect to the path on which the moving body should run. The constraint condition may be a condition relating to a relative relationship of position, distance, speed, acceleration, time or orientation of the moving body or the like to be satisfied, for example, by the moving body with respect to another object or by the moving body with respect to the path on which the moving body should run.

The violation time may be a time at which the moving body can no longer satisfy a constraint condition. The term "predict" may be interchanged with a term "presume" or "estimate". When the moving body violates a constraint condition, the moving body may collide with another object as a result. Also, when the moving body violates a constraint condition, the moving body may depart from the path on which the moving body should run as a result. Also, when the moving body violates a constraint condition, a task that should be executed by the moving body cannot be executed as a result. The task that should be executed by the moving body may be, for example, to convey a load by operating in collaboration with another moving body.

By using the violation time, the deadline calculating unit 13 calculates an execution deadline of an avoidance operation for avoiding a violation of a constraint condition. The avoidance operation may be a moving body control to be executed by the moving body, such as changing the direction of movement of the moving body, causing the moving body to decelerate, causing the moving body to stop or causing the moving body to accelerate. Furthermore, the avoidance operation may be instructing a moving body control to the moving body, which is executed by the communication control apparatus 10 via the communication unit 11. Alternatively, the avoidance operation may be transmission of, for example, positional information from the moving body to the communication control apparatus 10, which is performed by the moving body to receive an instruction of a moving body control by the communication control apparatus 10.

The execution deadline may be, for example, information regarding a relative time that is defined as an elapsed time from an absolute time or "reference time such as a current time". For example, even when the moving body executes an avoidance operation immediately before a violation time, the moving body sometimes cannot avoid a violation of the constraint condition. In other words, a predetermined period is required to be provided between the violation time and the execution deadline.

As a time difference between a current time and the execution deadline decreases, the communication control unit 14 increases a priority level of a communication with the moving body. As a time difference between a current time and the execution deadline decreases, a grace period until the execution deadline of an avoidance operation to be performed for avoiding a violation of a constraint condition decreases.

The priority level of a communication may be controlled by an application control or a network control. In an application control, for example, an information transmission interval, a transmission cycle, or a transmission frequency between the moving body and the communication control apparatus 10 is controlled in an application layer.

In a network control, the priority level of a communication is controlled in a transport layer, a network layer or a data link layer. For example, in the transport layer or network layer, an IP flow is identified, and many communication bands are allocated to the IP flow corresponding to a communication having a high priority level, or the communication band for an IP flow corresponding to a communication having a low priority level is limited. The priority level of a communication may be controlled by a radio resource control in the data link layer. Here, the data link layer may be interchanged with a media access control (MAC) layer.

A radio resource control to be executed by the communication control unit 14 is now described. In a case where the communication control apparatus 10 remotely controls an operation of a moving body, the priority level of a communication between the moving body and the communication control apparatus 10 increases as a time difference between a current time and the execution deadline decreases in order to securely execute an avoidance operation for avoiding a violation of a constraint condition. Also, as a time difference between a current time and the execution deadline decreases, the moving body is required to securely notify information on the moving body to the communication control apparatus 10 in order to receive a proper remote control. For that, the communication control unit 14 increases the radio resource to be allocated to a moving body having a small time difference between a current time and the execution deadline, that is, having a high priority level.

Alternatively, in a case where the communication control apparatus 10 is included in a moving body, the communication control apparatus 10 may transmit information on the moving body to another moving body in order to notify the other moving body of presence of the moving body or a state of the moving body. In this case, information on the moving body is required to be securely transmitted to the other moving body in order to cause the other moving body to securely execute an avoidance operation as a time difference between a current time and the execution deadline decreases. For that, the communication control unit 14 increases the number of radio resources for transmitting information to the other moving body as a time difference between a current time and the execution deadline decreases. For the communication between moving bodies, a communication technology called "Device to Device (D2D)" may be used in which moving bodies directly communicate with each other not through, for example, a base station as well as an ad hoc mode in a wireless LAN.

The term "radio resource" may be interchanged with a term "communication resource". The radio resource may be a time resource, a frequency resource, a transmission power resource or a combination thereof. In order to increase radio resource by using a time resource, for example, the transmission cycle or transmission interval may be shortened, or the transmission frequency may be increased. In order to increase radio resource by using a frequency resource, a frequency band, the number of sub carriers or the number of channels to be allocated may be increased, for example. In order to increase radio resource by using a transmission power resource, for example, the transmission power may be increased. Alternatively, a control over the radio resource may be a change of a modulation method or an error correction method. In order to increase the priority level of a communication, for example, the modulation method or error correction level may be changed to one having a higher error tolerance.

As described above, the communication control apparatus 10 can control the priority level of a communication with a moving body in consideration of an execution deadline of an avoidance operation for avoiding a violation of a constraint condition. It can be said that a moving body having a small time difference between a current time and an execution deadline is a moving body having a high priority level or emergency degree. In other words, it can be said that a moving body having a small time difference between a current time and an execution deadline is a moving body having a high possibility to violate a constraint condition. The communication control apparatus 10 can cause a moving body having a high possibility to violate a constraint condition as described above to securely execute an avoidance operation by increasing the priority level of a communication with the moving body.

Second Example Embodiment

Figure 2:
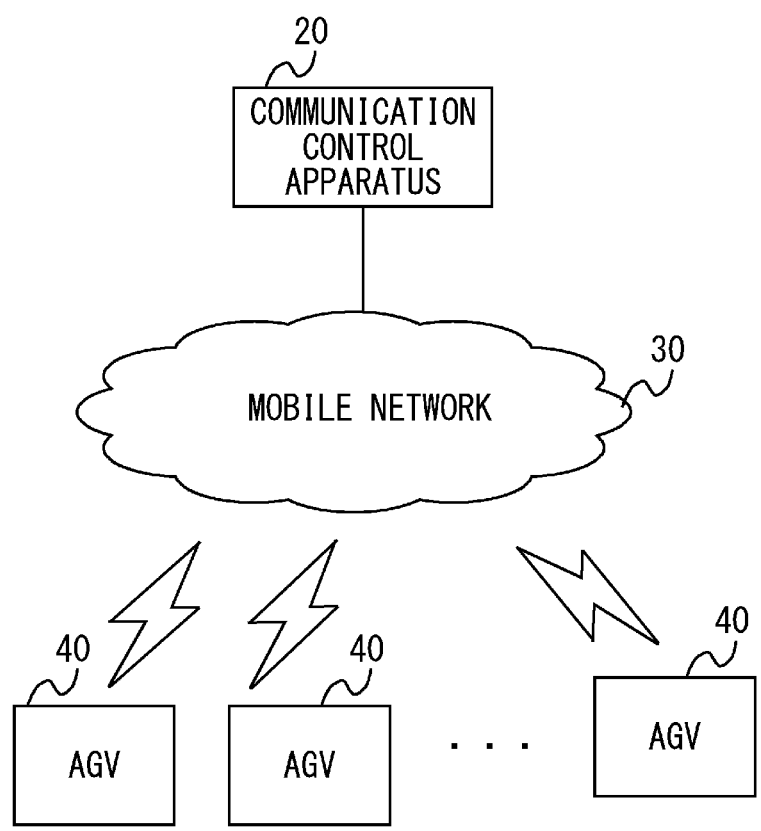
FIG. 2 is a configuration diagram of a communication system according to a second example embodiment.

Next, a configuration example of a communication system according to a second example embodiment is described with reference to FIG. 2. The communication system in FIG. 2 includes a communication control apparatus 20, a plurality of AGVs 40, and a mobile network 30. The communication control apparatus 20 corresponds to the communication control apparatus 10 in FIG. 1. The AGVs 40 correspond to the moving bodies. Each of the AGVs 40 communicates with the communication control apparatus 20 over the mobile network 30. The mobile network 30 may be a network that is managed or operated by a carrier, for example. Instead of or in addition to the mobile network 30, a wireless local area network (LAN) may be used. The AGVs 40 may be connected to the mobile network 30 via a wireless communication line. Also, the communication control apparatus 20 may be connected to the mobile network 30 via a wireless communication line or a wired communication line.

Figure 3:
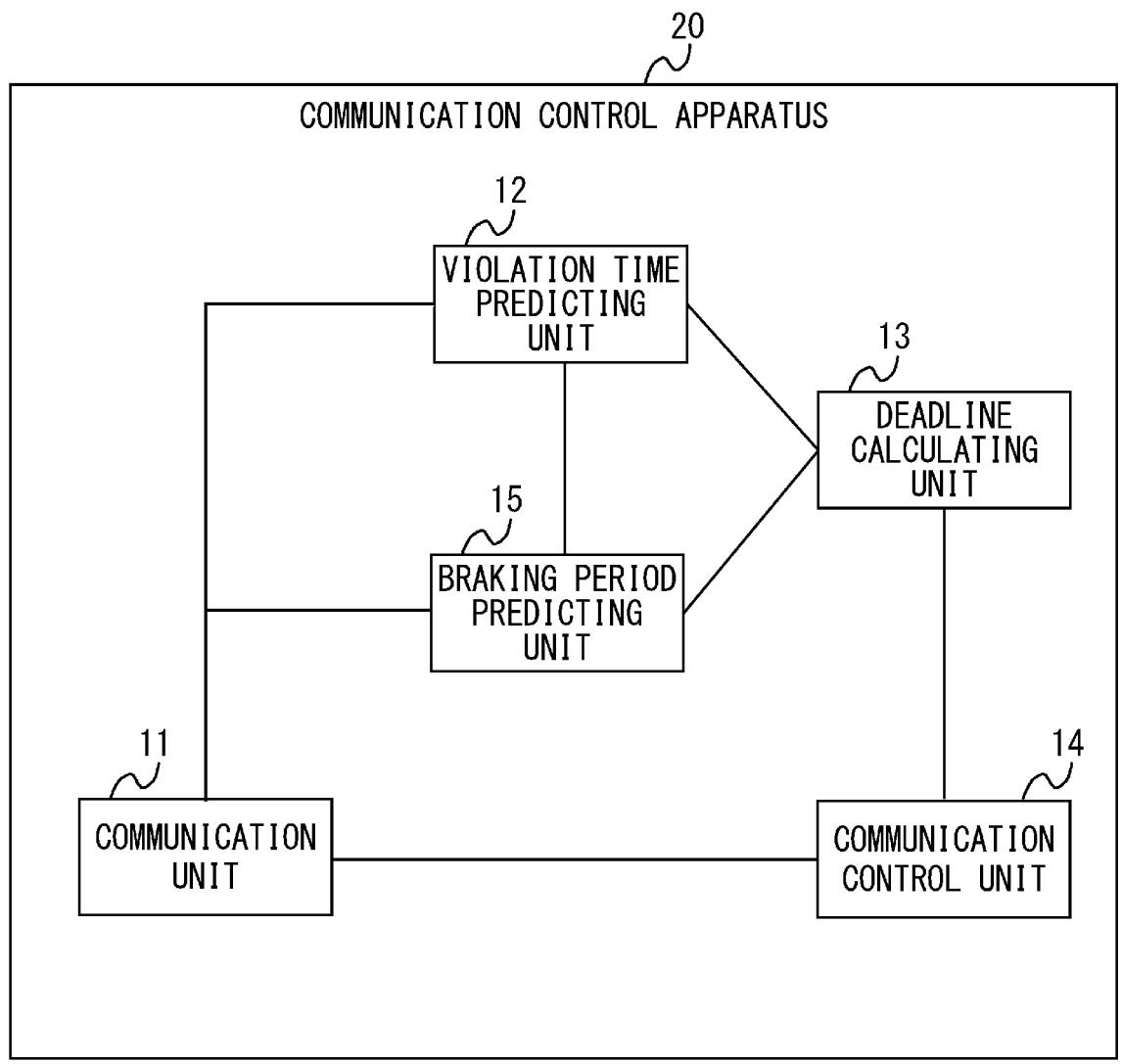
FIG. 3 is a configuration diagram of a communication control apparatus according to the second example embodiment.

Next, a configuration example of the communication control apparatus 20 according to the second example embodiment is described with reference to FIG. 3. The communication control apparatus 20 includes a communication unit 11, a violation time predicting unit 12, a deadline calculating unit 13, a communication control unit 14, and a braking period predicting unit 15. Detail description of functions and operations of the communication unit 11, violation time predicting unit 12, deadline calculating unit 13 and communication control unit 14 included in the communication control apparatus 20 that are the same as those of the communication control apparatus 10 in FIG. 1 is omitted.

The violation time predicting unit 12 predicts a time at which AGVs 40 collide with each other or a time at which an AGV 40 collide with a structure or the like. It is assumed here that, as a constraint condition relating to a relative relationship between a moving body and another object, a condition is defined that AGVs 40 or an AGV 40 and a structure do not collide with each other. The expression "do not collide" may refer to a state that the distance between AGVs 40 or the distance between an AGV 40 and a structure is greater than or equal to a predetermined value.

Figure 4:
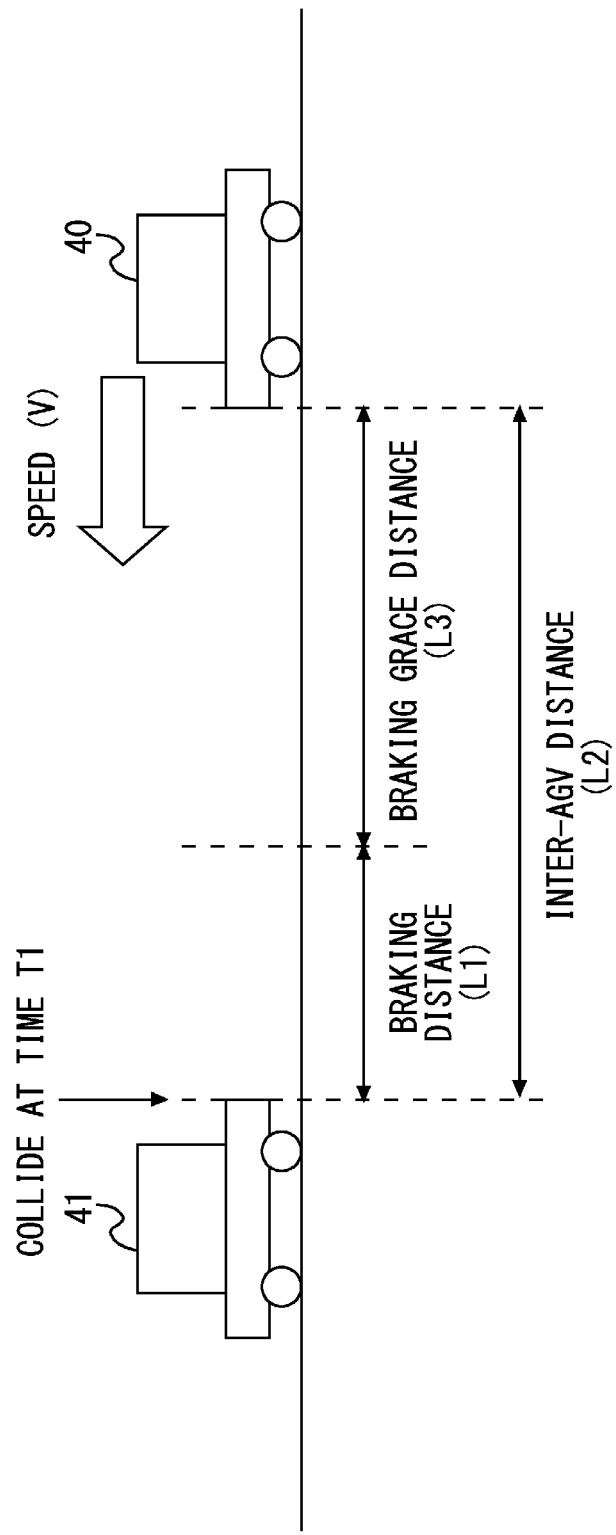
FIG. 4 is a diagram for explaining processing of predicting a time at which an AGV collides with another still AGV according to the second example embodiment.

Here, with reference to FIG. 4, processing is described in which the violation time predicting unit 12 predicts a time at which an AGV 40 collides with a still AGV 41. FIG. 4 shows a state that the AGV 40 moves at a speed V toward the AGV 41 that is staying still. The violation time predicting unit 12 obtains positional information of the AGV 40 and the AGV 41 through the communication unit 11. The violation time predicting unit 12 calculates a distance L2 between the AGV 40 and the AGV 41 by using the obtained positional information. Furthermore, the violation time predicting unit 12 calculates a violation time T1 by adding L2/V to a current time T0. The violation time predicting unit 12 outputs information regarding the violation time T1 to the deadline calculating unit 13.

Having described the processing of predicting a time at which the AGV 40 collides with the AGV 41 with reference to FIG. 4, a time at which the AGV 40 collides with a structure instead of the AGV 41 may be predicted. In this case, the violation time predicting unit 12 may identify a position of the structure by using map information or the like.

The braking period predicting unit 15 predicts a braking period of the AGV 40. The braking period is a period from a time at which the AGV 40 starts braking to a time at which the AGV 40 stops. The braking period predicting unit 15 may predict a braking period t elapsing until the speed of the AGV 40 reaches 0 by, for example, assuming a predetermined deceleration and using the current speed of the AGV 40 and the assumed deceleration. The AGV 40 moves by a braking distance L1 in the braking period t. Also, the braking period predicting unit 15 may determine a deceleration in consideration of, for example, a live load or a coefficient of friction against the ground of the AGV 40. Also, a deceleration in a range that the load does not fall may be acquired by using, for example, the center of gravity and resisting moment of the load. The deceleration may be predetermined. The braking period predicting unit 15 may obtain positional information of the AGV 40 at different times from the communication unit 11 and thus calculate a speed of the AGV 40. Also, speed information may be obtained from the AGV 40. Also, in a case where the speed of the AGV 40 is predetermined, the braking period predicting unit 15 may use the predetermined speed of the AGV 40 for predicting a braking period. Furthermore, the speed of a moving body to be used for predicting a braking period may be a predicted value of a future speed, without limiting to the current speed. For example, the braking period predicting unit 15 may obtain a collision time T1 predicted by the violation time predicting unit 12 and predict a speed of the moving body at the collision time T1 or at a predetermined time before the collision time T1. For example, a case is considered where, at a current time, a moving body is running at a speed of v0 [m/s] and an acceleration of a [m/s/s]. In this case, the speed after Tc seconds can be predicted as MIN (v0+a*Tc, Vmax). Here, Vmax denotes a maximum speed of the moving body, and MIN(X, Y) denotes a lower value between X and Y. The braking period predicting unit 15 outputs information regarding the braking period t to the deadline calculating unit 13.

The deadline calculating unit 13 calculates a braking grace time T2 by subtracting the braking period t from the violation time T1. The braking grace time T2 corresponds to an execution deadline for executing a braking operation by the AGV 40 as an avoidance operation. The deadline calculating unit 13 outputs information regarding the braking grace time T2 to the communication control unit 14.

As the difference between the braking grace time T2 of the AGV 40 and the current time T0 decreases, the communication control unit 14 increases the priority level of a communication with the AGV 40. For example, as the difference between the braking grace time T2 of the AGV 40 and the current time T0 decreases, the communication control unit 14 increases the radio resource to be allocated to the AGV 40. Also, as the difference between the braking grace time T2 of the AGV 40 and the current time T0 increases, the communication control unit 14 reduces the radio resource to be allocated to the AGV 40.

Also, the violation time predicting unit 12 may output information regarding the distance L2 between the AGV 40 and the AGV 41 to the deadline calculating unit 13. In this case, the deadline calculating unit 13 can calculate a braking grace distance L3 by subtracting the braking distance L1 from the distance L2. From this, assuming the current time is T0, the braking grace time can be calculated as T2=T0+L3/V. In other words, the AGV 40 is required to execute a braking operation from the current time to a time after L3/V. The deadline calculating unit 13 may obtain the braking distance L1 from the braking period predicting unit 15. Alternatively, the deadline calculating unit 13 may calculate the braking distance L1 by using the braking period t obtained from the braking period predicting unit 15 and the speed of the AGV 40.

As the difference between the braking grace time T2 and the current time T0 or L3/V decreases, the communication control unit 14 may increase the radio resource to be allocated to the AGV 40. The communication control unit 14 may transmit information regarding a communication control, for example, information regarding the allocated radio resource to the AGV 40 through the communication unit 11. Alternatively, the communication control unit 14 may transmit information regarding the braking grace time T2 to each of the AGVs 40. In this case, each of the AGVs 40 may calculate the difference between the braking grace time T2 and the current time T0 and performs the communication control.

As the difference between the braking grace time T2 of the AGV 40 and the current time T0 decreases, the communication control unit 14 may increase the transmission power to be allocated to the AGV 40. Alternatively, as the difference between the braking grace time T2 of the AGV 40 and the current time T0 decreases, the communication control unit 14 may widen the frequency band to be allocated to the AGV 40. Alternatively, as the difference between the braking grace time T2 of the AGV 40 and the current time T0 decreases, the communication control unit 14 may increase the number of transmission opportunities to be allocated to the AGV 40 or the transmission frequency of the AGV 40. Increasing the number of transmission opportunities or the transmission frequency may reduce the transmission cycle. Alternatively, as the difference between the braking grace time T2 of the AGV 40 and the current time T0 decreases, the communication control unit 14 may increase the error correction level. The error correction level may be interchanged with precision of error correction.

Also, the communication control unit 14 may provide an upper limit value of the transmission cycle. By providing an upper limit value for the transmission cycle of information transmission from the AGV 40, a state of the AGV 40 or a surrounding running environment state grasped by a sensor in the AGV 40 can be periodically collected or grasped. The running environment state may be, for example, information on an obstacle such as a human or an object.

Also, the communication control unit 14 may provide a lower limit of the transmission power to be allocated to the AGV 40 and a lower limit of the frequency bandwidth. When the difference between the braking grace time T2 of the AGV 40 and the current time T0 is higher than a predetermined threshold value, the communication control unit 14 may allocate the lower limit value of the transmission power, the lower limit value of the frequency bandwidth and the upper limit value of the transmission cycle to the AGV 40.

Also, the communication control unit 14 may provide an upper limit value of the transmission power to be allocated to the AGV 40, an upper limit value of the frequency bandwidth, and a lower limit value of the transmission cycle. When the difference between the braking grace time T2 of the AGV 40 and the current time T0 is lower than the predetermined threshold value, the communication control unit 14 may allocate the upper limit value of the transmission power, the upper limit value of the frequency bandwidth, and the lower limit value of the transmission cycle to the AGV 40.

Also, when the difference between the braking grace time T2 of the AGV 40 and the current time T0 is lower than the predetermined value, the communication control unit 14 may control the priority level of a communication. For example, when the difference between the braking grace time T2 of the AGV 40 and the current time T0 is lower than the predetermined value, more radio resource than the currently allocated radio resource may be allocated to the AGV 40. Also, instead of the radio resource control in the data link layer, the communication control unit 14 may perform a network control in the transport layer or the network layer. Alternatively, the communication control unit 14 may perform an application control.

Figure 5:
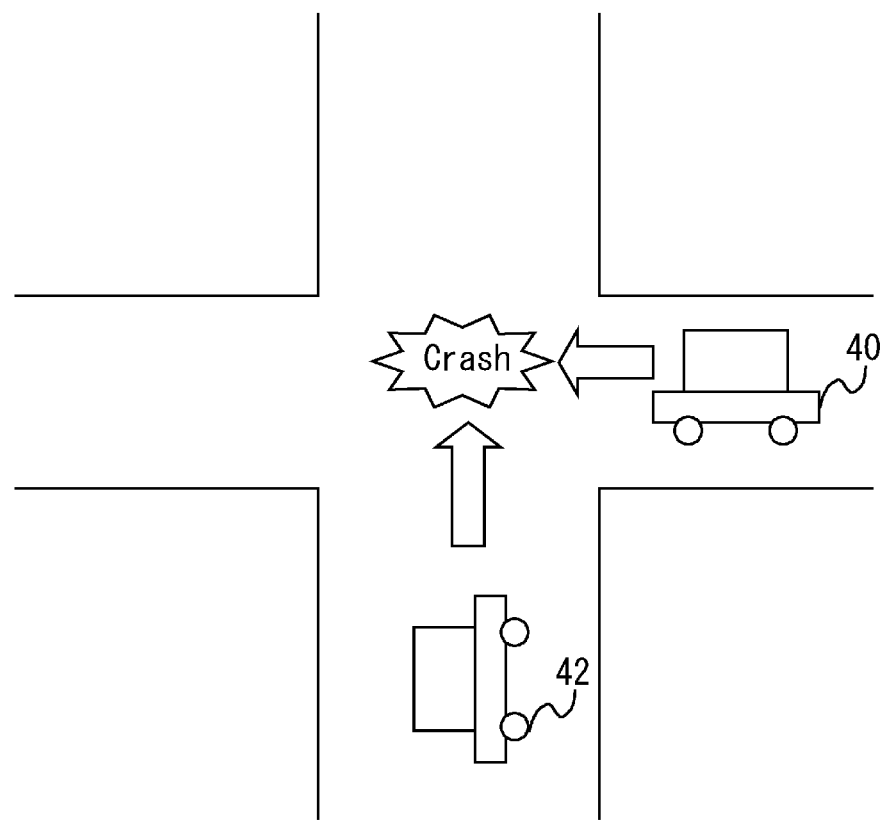
FIG. 5 is a diagram for explaining processing of predicting a time at which running AGVs collide with each other according to the second example embodiment.

Next, processing of predicting a time at which the running AGV 40 and a running AGV 42 collide with each other is described with reference to FIG. 5. The violation time predicting unit 12 obtains positional information, speed information and movement direction information of the AGV 40 and the AGV 42 through the communication unit 11. It should be noted that the speed and the movement direction may be calculated by using positional information acquired at different times. Also, in a case where the speeds of the AGV 40 and the AGV 42 are predetermined, the violation time predicting unit 12 may use the predetermined speeds.

The violation time predicting unit 12 calculates a position after a lapse of a predetermined period of time by using the current positional information, speed information and movement direction information. It should be noted that, in a case where the running routes of the AGV 40 and the AGV 42 are predetermined, the violation time predicting unit 12 may obtain a position after a lapse of a predetermined period of time from, for example, a device that manages the running route of each AGV. When the positions of the AGV 40 and the AGV 42 agree after a lapse of a predetermined period of time, the violation time predicting unit 12 predicts that the AGV 40 and the AGV 42 will collide after a lapse of the predetermined period of time. Alternatively, if the difference between positions of the AGV 40 and AGV 42, that is, the distance between the AGVs is less than or equal to a predetermined value, the violation time predicting unit 12 predicts that the AGV 40 and the AGV 42 will collide after a lapse of the predetermined period of time. The violation time predicting unit 12 may calculate a violation time T1 by, for example, adding the predicted time at which the collision occurs to the current time.

Alternatively, in addition to the current positions and speeds of the AGV 40 and the AGV 42, the violation time predicting unit 12 may predict an existence range in which the AGV 40 and the AGV 42 possibly exist after a lapse of a predetermined period of time by using a physical limitation of an acceleration. The physical limitation of an acceleration may be, for example, a maximum value and a minimum value of an acceleration predetermined as a performance of the AGV 40 and the AGV 42. Alternatively, the physical limitation of the acceleration may be a value calculated in consideration of, for example, a live load or a coefficient of friction against the ground. Alternatively, the physical limitation of an acceleration may be a value calculated in a range that the load does not fall by using, for example, the center of gravity and resisting moment of the load. For example, existence ranges of the AGV 40 and the AGV 42 after a lapse of a predetermined period of time may be predicted by using, for example, the current positions and speeds of the AGV 40 and the AGV 42 and the maximum value and minimum value of the acceleration. If the existence ranges of the AGV 40 and the AGV 42 overlap even partially, it may be predicted that the AGV 40 and the AGV 41 will collide after a lapse of the predetermined period of time. Note that, by sequentially increasing the time to predict as current time+$\Delta T$, current time+$2*\Delta T$, current time+$3*\Delta T$ and predicting the presence/absence of a collision at each of the times, the first time determined as having a collision may be predicted as a collision time of the AGV 40 and the AGV 42. Also, by using information regarding the current movement directions of the AGV 40 and AGV 42, the violation time predicting unit 12 may narrow the existence ranges of the AGV 40 and the AGV 42. Also, by using map information including routes along which the AGV 40 and the AGV 42 may possibly run, the violation time predicting unit 12 may narrow the existence ranges of the AGV 40 and the AGV 42.

Here, the communication control unit 14 may compare differences between the braking grace time T2 and the current time T0 of the AGV 40 and the AGV 42 and allocate more radio resource to the AGV having a smaller one of the differences. In other words, the communication control unit 14 may compare the differences between the braking grace time T2 and the current time T0 of the AGV 40 and the AGV 42 and allocate radio resource by priority to the AGV having a smaller one of the differences. Furthermore, in a case where three or more AGVs exist, the communication control unit 14 may compare the differences between the braking grace time T2 and the current time T0 of the AGVs and allocate more radio resource to the AGV having a smaller one of the differences than the AGV having a larger one of the differences or than the AGV with which a collision is not predicted.

Next, a flow of processing of allocating radio resource according to the second example embodiment is described with reference to FIG. 6. The flow of processing of allocating radio resource represents an example of a method for controlling a priority level of a communication with each AGV. First, the communication unit 11 receives positional information from each of the AGVs 40 (S11). In this case, the communication unit 11 may receive speed information and movement direction information along with the positional information. The communication unit 11 outputs the received positional information to the violation time predicting unit 12 and the deadline calculating unit 13. Also, the communication unit 11 may obtain positional information from each of the AGVs 40 at different times.

Next, the violation time predicting unit 12 predicts a time at which the AGV 40 collides with another AGV or a structure or the like (S12). By using the positional information of the AGV 40 and other AGVs, the violation time predicting unit 12 may calculate a speed of each of the AGVs and calculate times at which the AGV 40 and other AGVs collide. Alternatively, the violation time predicting unit 12 may identify a position of a structure by using map information or the like and calculate a time at which the AGV 40 and the structure collide. The violation time predicting unit 12 outputs, to the deadline calculating unit 13, information regarding the times at which the AGV 40 collides with other AGVs or a structure or the like as violation times.

Next, the braking period predicting unit 15 predicts a braking period of the AGV 40 or braking periods of the AGV 40 and other AGVs (S13). For example, the braking period predicting unit 15 predicts a braking period by using a current speed of each of the AGVs and an assumed predetermined deceleration. The braking period predicting unit 15 outputs information regarding the predicted braking period to the deadline calculating unit 13.

Figure 6:
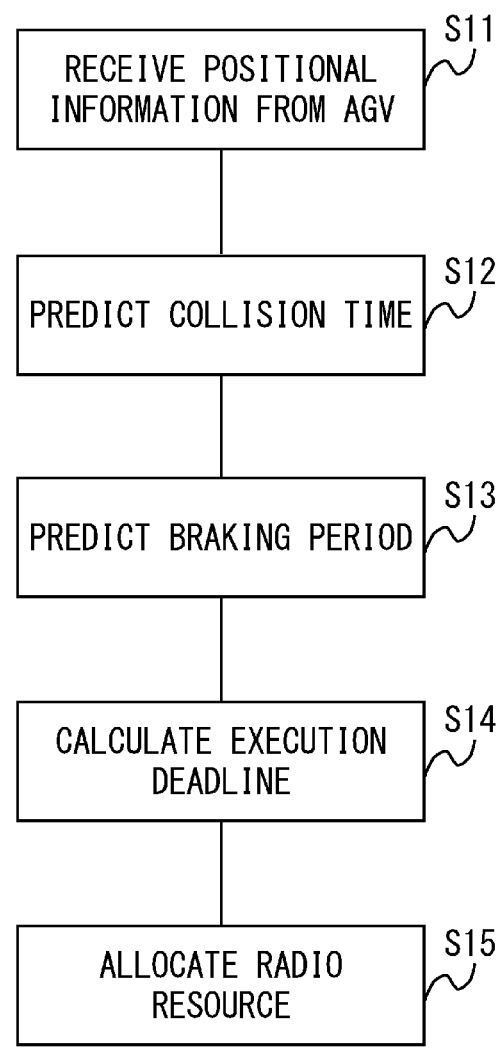
FIG. 6 is a diagram showing a flow of processing of allocating radio resource according to the second example embodiment.

Also, having described the prediction of a braking period as processing to be executed after the prediction of a collision time in step S12 with reference to FIG. 6, the prediction of a braking period may be executed before the prediction of a collision time. Alternatively, the prediction of a collision time in step S12 and the prediction of a braking period in step S13 may be executed substantially at the same time.

Next, by using the information regarding the times at which the AGV 40 collides with other AGVs or a structure or the like and the braking period of each of the AGVs, the deadline calculating unit 13 calculates an execution deadline of the AGV 40 or execution deadlines of the AGV 40 and other AGVs (S14). The deadline calculating unit 13 calculates an execution deadline by subtracting the braking period from the time at which a collision occurs. The deadline calculating unit 13 outputs information regarding the execution deadline relating to each of the AGVs to the communication control unit 14.

Next, the communication control unit 14 increases the radio resource to be allocated to the AGV 40 as a time difference between a current time and the execution deadline of the AGV 40 decreases (S15).

As described above, in a case where a braking operation is executed as a collision avoidance operation in the AGV 40, the communication control apparatus 20 can control the priority level of a communication in consideration of the braking period. Specifically, the communication control apparatus 20 handles a time acquired by subtracting the braking period from the time at which the AGV 40 collides with another AGV or a structure or the like as an execution deadline of an avoidance operation and, as the period from a current time to the execution deadline decreases, increases the radio resource to be allocated.

On the other hand, the communication control apparatus 20 controls the priority level of a communication in consideration of not only the collision time but also the braking period. Thus, the communication control apparatus 20 can complete the communication required for a collision avoidance by the execution deadline of the collision avoidance operation of the AGV. Therefore, compared with the case where a collision risk or a collision time is only determined, the communication control apparatus 20 can reduce the risk or possibility that the AGV collides with another AGV or a structure or the like. In other words, the communication control apparatus 20 can realize efficient priority-level control for collision avoidance.

Third Example Embodiment

Figure 7:
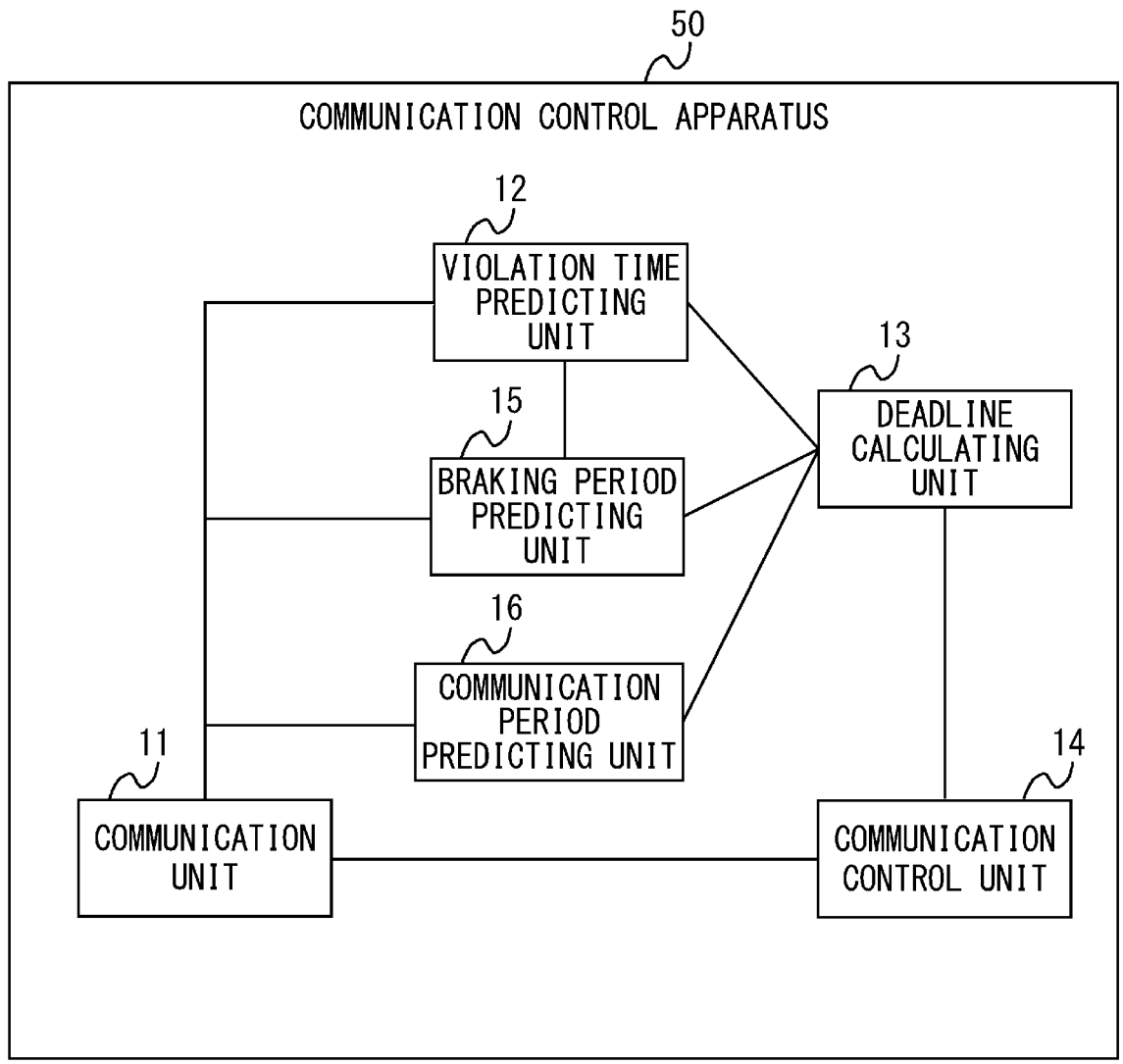
FIG. 7 is a configuration diagram of a communication control apparatus according to a third example embodiment.

Next, a configuration example of a communication control apparatus 50 according to a third example embodiment is described with reference to FIG. 7. The communication control apparatus 50 further includes a communication period predicting unit 16 in addition to the communication control apparatus 20 in FIG. 3. Detail description of functions and processing of the communication control apparatus 50 that are the same as those of the communication control apparatus 20 is omitted.

The communication period predicting unit 16 predicts a communication period required for communicating predetermined information between the AGV 40 and the communication control apparatus 50. The communication period may be a period (upstream communication period) required to elapse until, for example, the communication control apparatus 50 receives a message transmitted from the AGV 40. Alternatively, the communication period may be a period (downstream communication period) required to elapse until the AGV 40 receives a message transmitted from the communication control apparatus 50. Alternatively, the communication period may be a period (reciprocal communication period) required from transmission by the AGV 40 of a message to the communication control apparatus 50 to reception by the AGV 40 of the message from the communication control apparatus 50. Alternatively, the communication period may be a period (reciprocal communication period) required from transmission by the communication control apparatus 50 of a message to the AGV 40 to reception by the communication control apparatus 50 of the message from the AGV 40. The message to be transmitted to the AGV 40 by the communication control apparatus 50 may be, for example, information regarding an instruction of a moving body control such as an acceleration, a deceleration or a change in movement direction of the AGV. Alternatively, the message to be transmitted to the AGV 40 by the communication control apparatus 50 may be information regarding a communication control. The information regarding a communication control may be, for example, information regarding the execution deadline calculated by the deadline calculating unit 13 or may be information on radio resource allocation determined by the communication control unit 14. The message to be transmitted from the AGV 40 to the communication control apparatus 50 may be, for example, positional information, speed information or movement direction information or may be information regarding a human, an object or another moving body that exists around the moving body.

The communication period predicting unit 16 may predict a communication period by using a measured value of a communication period, may predict the communication period by using information other than a communication period or may predict the communication period by combining both of those methods.

A method is described in which the communication period predicting unit 16 predicts a communication period by using a measured value of a communication period. For example, when a message is transmitted to the AGV 40 through the communication unit 11, the communication period predicting unit 16 may measure a reciprocal communication period elapsing until reception of a response message to the message from the AGV 40. Each of the upstream communication period and the downstream communication period may be regarded as a half of the reciprocal communication period. Alternatively, by giving time information to a message to be transmitted by the AGV 40 and the communication control apparatus 50 and acquiring a difference from a current time upon reception of the messages, an upstream communication period and a downstream communication period may be separately measured. In this case, the AGV 40 and the communication control apparatus 50 are desirably synchronized in time. The communication period predicting unit 16 may predict a communication period of a communication to be performed from a current time by statistically processing measured communication periods at a plurality of times. The statistical processing here may refer to processing of acquiring an average value, a median value, a lower X % value (such as 5% value, 10% value, 50% value, 90% value, or 95% value) of a cumulative probability distribution or the like with regard to communication periods measured a plurality of number of times. Alternatively, by using an arbitrary time-series prediction method such as an autoregressive integrated moving average (ARIMA) model or a long short term memory (LSTM), a future communication period may be predicted from communication periods measured a plurality of number of times. It should be noted that the measured communication periods may be managed in association with areas where the measurements are performed. For example, measured communication periods may be managed for each of divided sub areas acquired by dividing a whole area where the AGV 40 runs by a unit of a predetermined length. In this case, in order to predict a communication period of the AGV 40 that exists in a certain sub area, the communication period may be predicted by using a plurality of measured values associated with the sub area by the above-described statistical processing or time-series prediction method. By managing measured values in association with sub areas, a communication period can be predicted in consideration of a characteristic of radio quality that varies depending on the place. Furthermore, measured communication periods may be managed in association with time zones in which the measurements are performed. Alternatively, measured communication periods may be managed in association with both of time zones and areas subject to the measurements.

A method is described in which the communication period predicting unit 16 predicts a communication period by using information other than communication periods. For example, the communication period predicting unit 16 may obtain, measure or calculate radio quality and a radio resource usage rate between the AGV 40 and the communication control apparatus 50 and predict a communication period by using the radio quality and radio resource usage rate and a message size. The message size may be interchanged with a data size.

The radio quality may be received power or a desired-wave-to-interference-wave power ratio. The received power may be received power of a pilot signal or a reference signal or may be total received power measured in a predetermined frequency band. Examples of the received power include common pilot channel received signal code power (CPICH RSCP) in universal mobile telecommunications system (UMTS), reference signal received power (RSRP) in LTE, and a received signal strength indicator (RSSI) in a wireless LAN. On the other hand, the desired-wave-to-interference-wave power ratio is a ratio between received power of a desired signal and interference power and/or thermal noise power. Examples of the desired-wave-to-interference-wave power ratio include signal to interference plus noise ratio (SINR), signal to interference ratio (SIR), CPICH Ec/No in UMTS, reference signal received quality (RSRQ) in LTE.

The communication period predicting unit 16 may hold a correspondence relationship between radio quality and communication speed, which is expected under a condition that no radio resource is used. It is assumed that a communication speed expected from current radio quality, which is calculated from the correspondence relationship, is TPm [bps]. It is further assumed that a current radio resource usage rate is Lu (0<Lu<1) and that a message size is S [bits]. In this case, the communication period predicting unit 16 may predict a communication period as S/TPm/(1-Lu). For example, when S=1500 [Bytes]=12000 [bits], Lu=0.8, TPm=100 [Kbps]=100000 [bps], a communication period can be predicted as S/TPm/(1-Lu)=12000/100000/(1-0.8) =0.6 seconds. The communication period predicting unit 16 may further correct the predicted communication period with a communication error rate such as a packet error rate. For example, the predicted communication period may be corrected so as to be increased as the communication error rate increases. The communication period predicting unit 16 outputs the predicted communication period to the deadline calculating unit 13.

The deadline calculating unit 13 obtains information regarding a violation time of the AGV 40 from the violation time predicting unit 12 and obtains information regarding a braking period of the AGV 40 from the braking period predicting unit 15. Furthermore, the deadline calculating unit 13 obtains information regarding a communication period of the AGV 40 from the communication period predicting unit 16. The deadline calculating unit 13 calculates an execution deadline of an avoidance operation for avoiding a collision by subtracting the braking period and the communication period from the violation time.

Alternatively, the deadline calculating unit 13 may calculate an execution deadline of an avoidance operation for avoiding a collision by subtracting a communication period only from the violation time of the AGV 40.

As described above, the communication control apparatus 50 can calculate an execution deadline by subtracting a braking period and a communication period from a violation time or can calculate an execution deadline by subtracting a communication period only from a violation time. Even with the same violation time, it is predicted that the AGV 40 predicted as having a long communication period requires a longer time for communication required for collision avoidance, compared with the AGV 40 predicted as having a shorter communication period. In other words, the AGV 40 predicted as having a longer communication period is required to start the communication for avoiding a collision earlier than the AGV 40 predicted as having a shorter communication period. In a case where an execution deadline is calculated by subtracting a communication period from a violation time, more radio resource can be allocated to the communication with the AGV 40 which should start a communication earlier, compared with a case where a communication period is not subtracted from a violation time. In other words, allocation of radio resource can be suppressed for communication with the AGV 40 which may delay the start of communication. As a result, the communication control apparatus 10 can realize efficient radio resource allocation to the AGVs 40.

Fourth Example Embodiment

Figure 8:
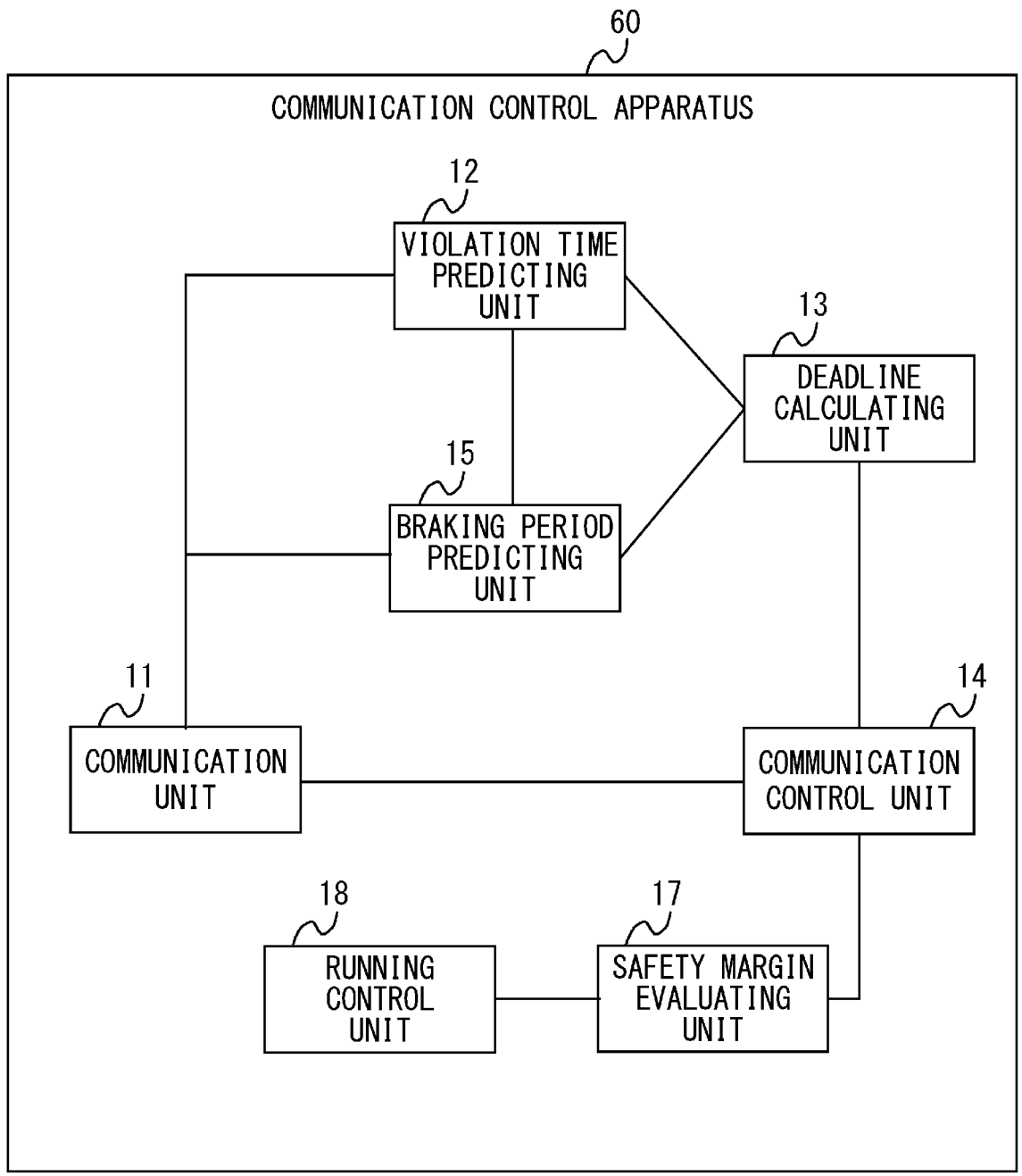
FIG. 8 is a configuration diagram of a communication control apparatus according to a fourth example embodiment.

Next, a configuration example of a communication control apparatus 60 according to a fourth example embodiment is described with reference to FIG. 8. The communication control apparatus 60 has a configuration further having a safety margin evaluating unit 17 and a running control unit 18 in addition to the communication control apparatus 20 in FIG. 3. Detail description of functions and processing of the communication control apparatus 60 that are the same as those of the communication control apparatus 20 is omitted. Also, the safety margin evaluating unit 17 and the running control unit 18 may be added to the communication control apparatus 50 in FIG. 7.

The safety margin evaluating unit 17 evaluates a safety margin of radio resource to be used by the AGV 40. The safety margin may be a proportion of an unused radio resource to a maximum radio resource that a wireless communication line connected by the AGV 40 has. The safety margin may be, for example, a proportion of an unused band to a maximum used band of a wireless communication line to be used by the AGV 40 or a proportion of an unused frequency channel or frequency carrier to a usable frequency channel or frequency carrier. Alternatively, the safety margin may be a proportion of unused slots to the maximum number of slots usable by the AGV 40, that is, a proportion of vacant slots. For example, the slots may be defined by using a time or a frequency band or may be defined by using a time and a frequency band. Alternatively, the safety margin may be a proportion of unused transmission power to maximum transmission power for radio communication. It should be noted that the safety margin may be an instant value at a specific point in time or may be an average value calculated over a predetermined period of time. Evaluating a safety margin may be interchanged with calculating or identifying a safety margin.

The safety margin evaluating unit 17 outputs information regarding the safety margin of radio resource to the running control unit 18.

The running control unit 18 controls running of the AGV 40 in accordance with the obtained safety margin. Controlling running of the AGV 40 may be, for example, controlling the running speed or running route of the AGV 40, the number of AGVs 40 to run or the like.

The running control unit 18 may predetermine a threshold value relating to a safety margin and limit running of the AGV 40 having a safety margin lower than the threshold value. For example, the running control unit 18 may reduce the running speed of the AGV 40 having a safety margin lower than the threshold value. Alternatively, the running control unit 18 may stop the AGV 40 having a safety margin lower than the threshold value. Alternatively, the running control unit 18 may limit the running route of the AGV 40 having a safety margin lower than the threshold value within a predetermined range. Alternatively, when there is an AGV 40 having a safety margin lower than the threshold value, the running control unit 18 may limit the number of AGVs 40 to run so as to be equal to or lower than a predetermined value. It should be noted that, when running of the AGV 40 is limited, the importance level of the load to be conveyed by the AGV 40 or the emergency degree of the conveyance may be considered. For example, running of the AGV 40 which is conveying a non-important load or the AGV 40 with a low emergency degree of conveyance may be limited by higher priority than the AGV 40 which is conveying an important load or the AGV 40 with a high emergency degree of conveyance.

A case where the running speed of each of the AGVs 40 is high tends to have a higher collision occurrence probability than a case where the running speed of each of the AGVs 40 is low if the numbers of running AGVs 40 are equal. In other words, there is a high possibility that the case where the running speed of each of the AGVs 40 is high uses more radio resource for communication for collision avoidance than the case where the running speed of each of the AGVs 40 is low. Also, because the braking period depends on the running speed of the AGV 40, the braking period with a high running speed is longer than the braking period with a low running speed. In other words, compared with the case where the running speed is low, the case where the running speed is high has a smaller "difference between an execution deadline and a current time", and there is a high possibility that more radio resource is used. In this way, because the radio resource usage rate depends on the running speed of the AGV 40, the relationship between the running speed of the AGV 40 and the radio resource usage ratio may be analytically or experimentally modelled. The running control unit 18 may use the thus generated model and calculate a running speed for satisfying a predetermined safety margin.

As described above, the communication control apparatus 60 controls running of each of the AGVs 40 by using the safety margin. When an unexpected event occurs such as a device failure, fall of a load, or human intrusion, the AGV 40 is required to immediately notify the occurring event to the communication control apparatus, another management device or the like. However, in a case where its radio resource is used up to its limit and when an expected event occurs, the occurring event cannot be immediately notified to the communication control apparatus or the like. The communication control apparatus 60 acquires a predetermined safety margin by limiting running of the AGVs 40 which cannot acquire a predetermined safety margin so that, even when an unexpected event occurs, the occurring event can be immediately notified to the communication control apparatus or the like.

Fifth Example Embodiment

Figure 9:
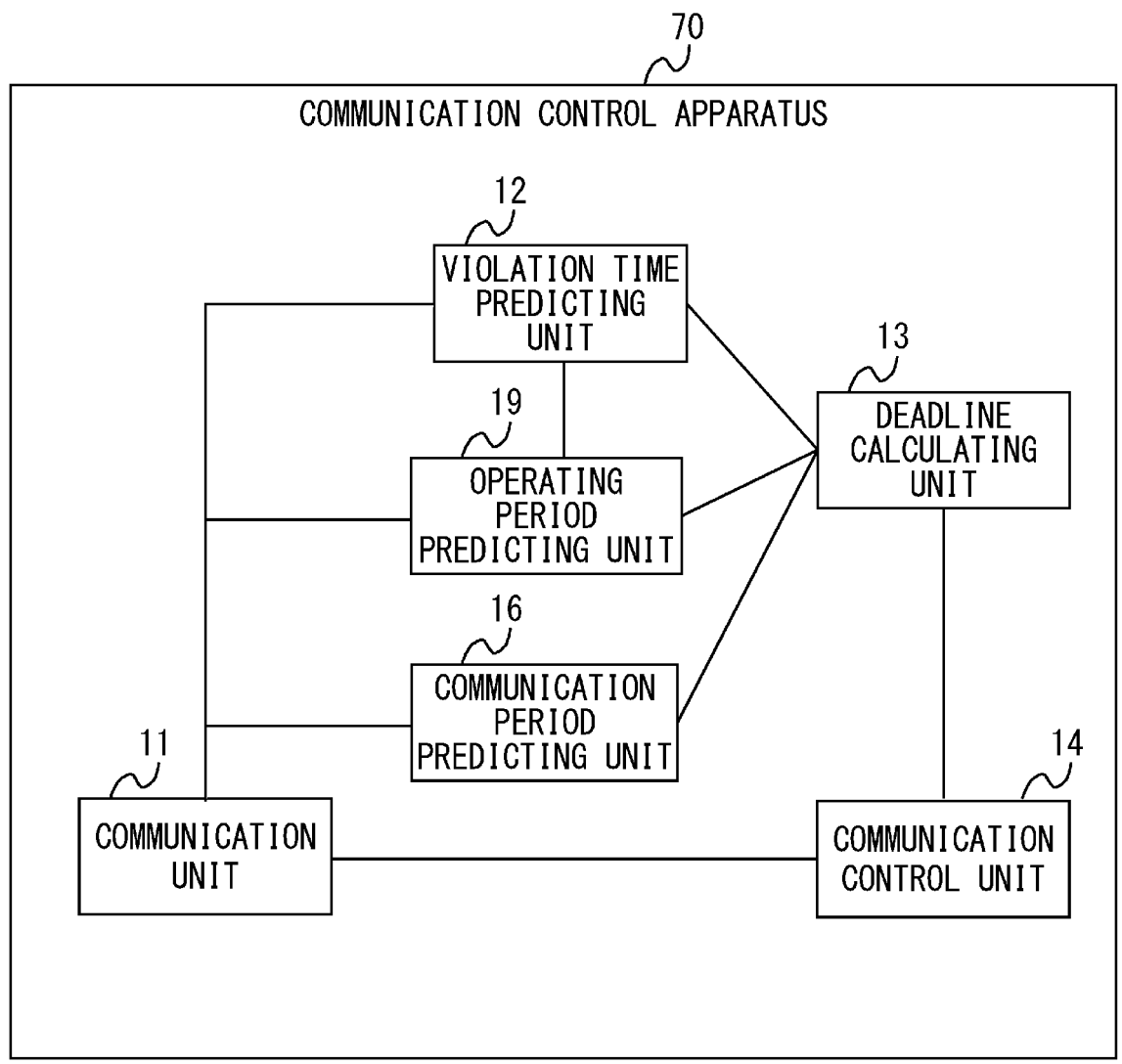
FIG. 9 is a configuration diagram of a communication control apparatus according to a fifth example embodiment.

Next, a configuration example of a communication control apparatus 70 according to a fifth example embodiment is described with reference to FIG. 9. According to the fifth example embodiment, a priority level control of a communication with the AGV 40 is described in a case where the communication control apparatus 20, the communication control apparatus 50, the communication control apparatus 60, the communication control apparatus 70 or a remote operation terminal (not shown) remotely operates the AGV 40 to cause the AGV 40 to move on a predetermined path.

In the communication control apparatus 70, the braking period predicting unit 15 in the communication control apparatus 50 is replaced by an operating period predicting unit 19. Detail description of the other configuration of the communication control apparatus 70 is omitted because it is the same as that of the communication control apparatus 50. Also, a communication control apparatus may be used in which the braking period predicting unit 15 in FIG. 8 is replaced by the operating period predicting unit 19. It should be noted that both of the operating period predicting unit 19 and the communication period predicting unit 16 are not always required, but a configuration having one of them may be provided.

Figure 10:
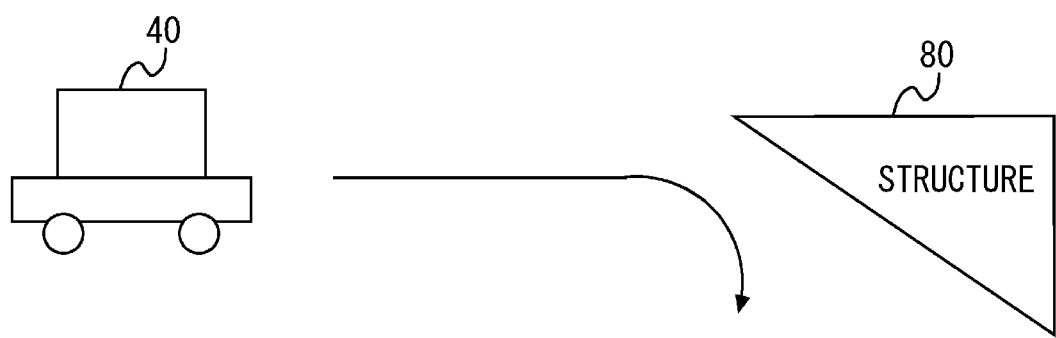
FIG. 10 is a diagram showing a path on which an AGV should run according to the fifth example embodiment.

In a case where the AGV 40 is caused to move along a predetermined path, the AGV 40 is required to run by satisfying a constraint condition that a departure distance from a path on which the AGV 40 should run is kept less than or equal to a constant value. The path on which the AGV 40 should run may be, for example, a path predetermined so as to avoid a collision with a structure 80, as shown in FIG. 10. The arrow in FIG. 10 indicates the path on which the AGV 40 should run.

When the AGV 40 continues the current running, the violation time predicting unit 12 predicts a time at which the departure distance from the path on which the AGV 40 should run exceeds the constant value. The time at which the departure distance exceeds the constant value is handled as a violation time. It is assumed that the violation time predicting unit 12 pre-holds information regarding the path on which the AGV 40 should run. The violation time predicting unit 12 may predict a movement path of the AGV 40 which continues running at a current speed V and in a current direction of movement or turning, compare between the predicted movement path and the path on which the AGV 40 should run, and identify a point (departure point) where the departure distance exceeds the constant value. The violation time predicting unit 12 may calculate the violation time by adding the period required to elapse until the AGV 40 running at a speed V reaches the departure point to a current time. The violation time predicting unit 12 outputs information regarding the violation time to the deadline calculating unit 13.

The operating period predicting unit 19 predicts a required period for an avoidance operation to be executed by the AGV 40 such that the departure distance from the path on which the AGV 40 should run does not exceed the constant value. The avoidance operation may be a moving body control such as deceleration, acceleration or rotation. The moving body control may be, for example, steering or driven-wheel control in the AGV 40 for changing the movement direction. The operating period predicting unit 19 outputs information regarding the required period for the avoidance operation to the deadline calculating unit 13.

The deadline calculating unit 13 may calculate an execution deadline for the avoidance operation in the AGV 40 by subtracting the required period for the avoidance operation from the violation time.

Alternatively, the deadline calculating unit 13 obtains information regarding the communication period of the AGV 40 from the communication period predicting unit 16. The deadline calculating unit 13 may calculate an execution deadline for the AGV 40 by subtracting the required period for the avoidance operation and the communication period of the AGV 40 from the violation time. Alternatively, the deadline calculating unit 13 may calculate an execution deadline for the AGV 40 by subtracting the communication period of the AGV 40 from the violation time.

As described above, by using the communication control apparatus 70, a priority level control of a communication with the AGV 40 being remotely operated so as to move on a predetermined path can be performed efficiently by keeping the departure distance from the path equal to or lower than a constant value.

Figure 11:
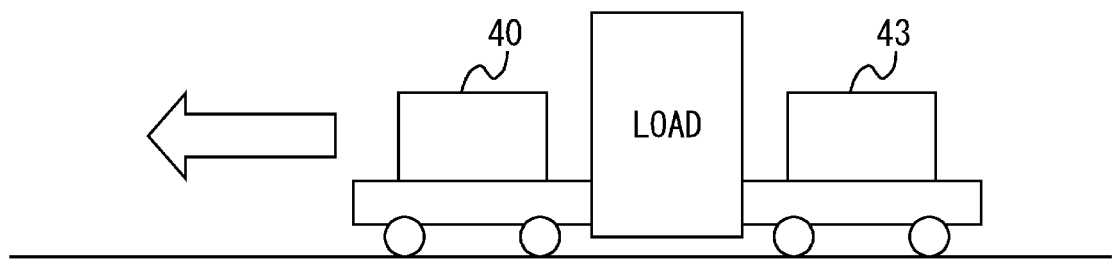
FIG. 11 is a diagram for explaining a task being executed by AGVs in collaboration according to the fifth example embodiment.

Also, the communication control apparatus 70 may be used for a priority level control of communications of the AGV 40 and an AGV 43 which are executing a task in which the AGVs operate in collaboration for conveying a load. For example, as shown in FIG. 11, the AGV 40 and the AGV 43 hold a load between them and convey the load. In such a case, the AGV 40 and the AGV 43 are required to run by satisfying a constraint condition that at least one of a difference in position, a difference in speed, a difference in orientation, and a difference in acceleration is within a predetermined range. In other words, the AGV 40 and the AGV 43 are required to run by satisfying a constraint condition that they keep a constant distance between them and moves in an identical direction. The violation time predicting unit 12 predicts a violation time at which the AGV 40 and the AGV 43 do not satisfy the constraint condition. The operating period predicting unit 19 may predict, as an operating period, the required period for a moving body control to be executed by the AGV 40 and the AGV 43. Regarding a communication to be required for a moving body control for avoiding a violation of a constraint condition, the communication period predicting unit 16 may predict a communication period thereof. The communication may be a communication relating to an instruction of the moving body control to the AGV 40 or a communication relating to transmission of, for example, positional information from the AGV 40 to the communication control apparatus 10, which is performed for receiving, by the AGV 40, an instruction of the moving body control from the communication control apparatus 10. Furthermore, the communication control unit 14 may calculate an execution deadline in consideration of the violation time, the operating period and the communication period and execute a priority level control of communications with the AGV 40 and the AGV 43. As described above, in consideration of one of the operating period and the communication period, an execution deadline may be calculated.

Sixth Example Embodiment

Figure 12:
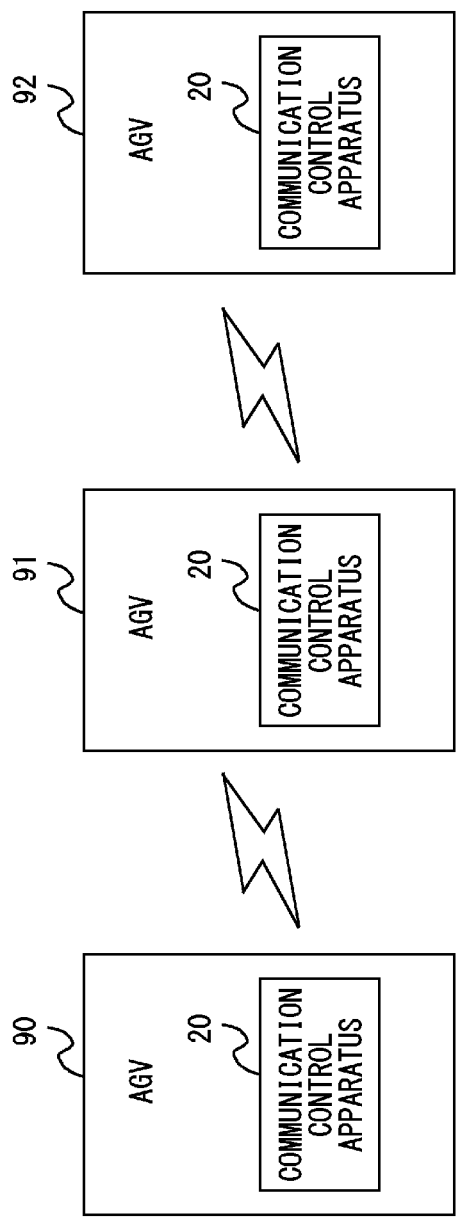
FIG. 12 is a configuration diagram of a communication system according to a sixth example embodiment.

Next, a configuration example of a communication system according to a sixth example embodiment is described with reference to FIG. 12. FIG. 12 shows that an AGV 90 and an AGV 91 and an AGV 91 and an AGV 92 are performing direct wireless communication. Performing direct wireless communication means that the AGV 90, the AGV 91 and the AGV 92 perform wireless communication with another AGV without via a base station or the like. In other words, performing direct wireless communication means that the AGV 90, the AGV 91 and the AGV 92 establish a connection or a wireless communication line with another AGV.

Also, FIG. 12 shows that each of the AGV 90 to AGV 92 has the communication control apparatus 20. Each of the communication control apparatuses 20 may perform an allocation control over radio resource for transmission of data from the AGV in which the communication control apparatus 20 is mounted to another AGV. Alternatively, for example, for performing wireless communication between the AGV 90 and the AGV 91, the communication control apparatus 20 mounted in the AGV 90 may perform the allocation control over the radio resource to be used by the AGV 91. Alternatively, one of the AGVs 90 to 92 may be defined as a representative apparatus, and the communication control apparatus 20 mounted in the representative apparatus may perform the allocation control over the radio resource to be used by other AGVs.

Although FIG. 12 shows that the AGVs 90 to 92 have the communication control apparatus 20, the AGVs 90 to 92 may have the communication control apparatus 50, the communication control apparatus 60 or the communication control apparatus 70 instead of the communication control apparatus 20.

As described above, when the AGVs 90 to 92 have the communication control apparatus 20, the communication control apparatus 50 or the communication control apparatus 60, a radio resource allocation control can thus be executed in a case where direct communication is performed between the AGVs.

Figure 13:
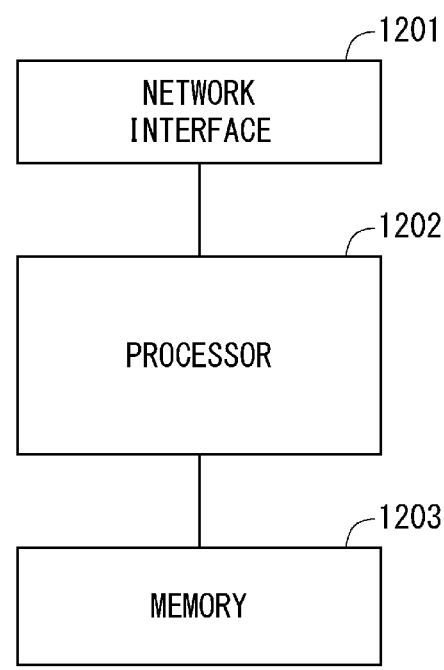
FIG. 13 is a configuration diagram of a communication control apparatus in each of the example embodiments.

FIG. 13 is a block diagram showing a configuration example of the communication control apparatuses 20, 50, 60 and 70 (hereinafter, "communication control apparatus 20 or the like"). Referring to FIG. 13, the communication control apparatus 20 or the like includes a network interface 1201, a processor 1202, and a memory 1203. The network interface 1201 is used for communicating with another network node device included in the communication system. The network interface 1201 may be used for performing wireless communication. For example, the network interface 1201 may be used for performing wireless LAN communication provided in IEEE 802.11 series or mobile communication provided in 3rd Generation Partnership Project (3GPP). Alternatively, the network interface 1201 may include a network interface card (NIC) based on, for example, IEEE 802.3 series.

The processor 1202 reads and executes software (computer program) from the memory 1203 to implement processing of the communication control apparatus 20 or the like described by using the flowchart or sequence according to the aforementioned embodiment. The processor 1202 may be, for example, a microprocessor, a micro processing unit (MPU), or a central processing unit (CPU). The processor 1202 may include a plurality of processors.

The memory 1203 includes a combination of a volatile memory and a non-volatile memory. The memory 1203 may include a storage arranged separately from the processor 1202. In this case, the processor 1202 may access the memory 1203 via an I/O interface, not shown.

In the example in FIG. 13, the memory 1203 is used for storing a software module group. The processor 1202 reads and executes the software module group from the memory 1203 and can thus implement processing of the communication control apparatus 20 or the like described according to the aforementioned embodiment.

As described with reference to FIG. 13, each of the processors included in the communication control apparatus 20 or the like executes one or a plurality of programs including an instruction group for causing a computer to perform an algorithm described with reference to the drawings.

In the aforementioned example, the program or programs can be stored by using various types of non-transitory computer-readable medium and can be supplied to a computer. The non-transitory computer-readable medium includes various types of tangible storage medium. Examples of the non-transitory computer-readable medium include a magnetic recording medium, a magneto-optical recording medium (such as a magneto-optical disk), a CD read only memory (CD-ROM), a CD-R, a CD-R/W, and a semiconductor memory. The magnetic recording medium may be, for example, a flexible disk, a magnetic tape, or a hard disk drive. The semiconductor memory may be, for example, a mask ROM, a programmable ROM (PROM), an erasable PROM (EPROM), a flash ROM, or a random access memory (RAM). Also, the program may be supplied to a computer through various types of transitory computer-readable medium. Examples of the transitory computer-readable medium include an electric signal, an optical signal and electromagnetic waves. The transitory computer-readable medium can supply the program to a computer via a wired communication path such as an electric wire and an optical fiber or a wireless communication path.

It should be noted that the present disclosure is not limited to the aforementioned example embodiments but can be changed as appropriate without departing from the spirit and scope of the present disclosure. Also, the present disclosure may be implemented by combining the example embodiments as appropriate.

A part or all of the aforementioned example embodiments are not limited to the following supplementary notes although they can also be described as in the following supplementary notes.

(Supplementary Note 1)

A communication control apparatus comprising:

a communication unit that communicates information to and from a moving body;

a violation time predicting unit that predicts a violation time at which the moving body violates a constraint condition relating to a relative relationship between the moving body and another object or a constraint condition relating to a relative relationship between the moving body and a path on which the moving body should run by using positional information of the moving body;

a deadline calculating unit that calculates an execution deadline of an avoidance operation for avoiding a violation of the constraint condition by using the violation time; and a communication control unit that increases a priority level of a communication with the moving body as a time difference between a current time and the execution deadline decreases.

(Supplementary Note 2)

The communication control apparatus according to Supplementary note 1, wherein the constraint condition relating to a relative relationship between the moving body and the other object is a condition relating to a relative relationship of at least one of position, speed, acceleration and orientation to be satisfied by the moving body with respect to the other object.

(Supplementary Note 3)

The communication control apparatus according to Supplementary note 1 or 2, wherein the constraint condition relating to a relative relationship between the moving body and the other object is that the moving body and the other object do not collide, the violation time predicting unit predicts a collision time with which a distance between the moving body and the other object is less than or equal to a predetermined value based on a position of the moving body and a position of the other object, and the deadline calculating unit calculates the execution deadline by using the collision time.

(Supplementary Note 4)

The communication control apparatus according to Supplementary note 2, wherein the constraint condition relating to a relative relationship between the moving body and the other object is to satisfy a condition that at least one of a difference in position, a difference in speed, a difference in acceleration and a difference in orientation between a first moving body and a second moving body that executes a task in collaboration with the first moving body is within a predetermined range, and the violation time predicting unit predicts a time at which the condition to be satisfied between the first moving body and the second moving body is no longer satisfied.

(Supplementary Note 5)

The communication control apparatus according to Supplementary note 1, wherein the constraint condition relating to a relative relationship between the moving body and a path on which the moving body should run is to satisfy that a condition that a distance between the moving body and the path on which the moving body should run is within a predetermined range, and the violation time predicting unit predicts a departure time at which the distance between the moving body and the path on which the moving body should run no longer falls within the predetermined range.

(Supplementary Note 6)

The communication control apparatus according to any one of Supplementary notes 1 to 5, wherein the deadline calculating unit calculates the execution deadline by using the violation time and a braking period or operating period of the moving body.

(Supplementary Note 7)

The communication control apparatus according to any one of Supplementary notes 1 to 6, further comprising a communication period predicting unit that predicts a communication period required for communicating predetermined information between the moving body and the communication control apparatus by using at least one of a measured value of a communication period, a communication speed, a communication error rate, radio quality, a radio resource usage rate and a data size between the moving body and the communication control apparatus, wherein the deadline calculating unit calculates the execution deadline by using the violation time and the communication period.

(Supplementary Note 8)

The communication control apparatus according to any one of Supplementary notes 1 to 7, further comprising:

a safety margin evaluating unit that evaluates a safety margin of radio resource to be used in the moving body; and a running control unit that controls running of the moving body in accordance with the safety margin.

(Supplementary Note 9)

A communication system comprising:

a communication unit that communicates information to and from a moving body, a violation time predicting unit that predicts a violation time at which the moving body violates a constraint condition relating to a relative relationship between the moving body and another object or a constraint condition relating to a relative relationship between the moving body and a path on which the moving body should run by using positional information of the moving body, a deadline calculating unit that calculates an execution deadline of an avoidance operation for avoiding a violation of the constraint condition by using the violation time, a communication control apparatus that transmits, to the moving body, information regarding a communication control that increases a priority level of a communication with the moving body as a time difference between a current time and the execution deadline decreases, and a moving body having a communication unit that receives the information regarding the communication control and a communication control unit that controls a priority level of a communication based on the information regarding the communication control.

(Supplementary Note 10)

The communication system according to Supplementary note 9, wherein the constraint condition relating to a relative relationship between the moving body and the other object is a condition relating to a relative relationship of at least one of position, speed, acceleration and orientation to be satisfied by the moving body with respect to the other object.

(Supplementary Note 11)

A communication control method in a communication control apparatus, the method comprising:

communicating information to and from a moving body;

predicting a violation time at which the moving body violates a constraint condition relating to a relative relationship between the moving body and another object or a constraint condition relating to a relative relationship between the moving body and a path on which the moving body should run by using positional information of the moving body;

calculating an execution deadline of an avoidance operation for avoiding a violation of the constraint condition by using the violation time; and increasing a priority level of a communication with the moving body as a time difference between a current time and the execution deadline decreases.

(Supplementary Note 12)

A non-transitory computer-readable medium storing a program causing a computer to:

communicate information to and from a moving body;

predict a violation time at which the moving body violates a constraint condition relating to a relative relationship between the moving body and another object or a constraint condition relating to a relative relationship between the moving body and a path on which the moving body should run by using positional information of the moving body;

calculate an execution deadline of an avoidance operation for avoiding a violation of the constraint condition by using the violation time; and increase a priority level of a communication with the moving body as a time difference between a current time and the execution deadline decreases.

Having described above the present invention of the subject application with reference to the example embodiments, the present invention of the subject application is not limited by the description above. Various changes that can be understood by those skilled in the art without departing from the scope of the invention can be made to the configuration and details of the present invention of the subject application.

This application claims priority based on Japanese Patent Application No. 2019-015598 filed on Jan. 31, 2019, the entirety of which is incorporated herein.

REFERENCE SIGNS LIST 10 communication control apparatus
11 communication unit
12 violation time predicting unit
13 deadline calculating unit
14 communication control unit
15 braking period predicting unit
16 communication period predicting unit
17 safety margin evaluating unit
18 running control unit
19 operating period predicting unit
20 communication control apparatus
30 mobile network
40 AGV
41 AGV
42 AGV
43 AGV
50 communication control apparatus
60 communication control apparatus
70 communication control apparatus
80 structure
90 AGV
91 AGV
92 AGV

What is claimed is:

1. A communication control apparatus comprising:
at least one memory storing instructions, and
at least one processor configured to execute the instructions to;
communicate information to and from a first moving body;
predict a violation time at which the first moving body violates a constraint condition relating to a relative relationship between the first moving body and another object by using positional information of the first moving body;
calculate an execution deadline of an avoidance operation for avoiding a violation of the constraint condition by using the violation time; and
increase a priority level of a communication with the first moving body as a time difference between a current time and the execution deadline decreases, wherein
the constraint condition relating to the relative relationship between the first moving body and the other object comprises a condition relating the first moving body and a second moving body that executes a task in collaboration with the first moving body.

2. The communication control apparatus according to claim 1, wherein the constraint condition relating to a relative relationship between the first moving body and the other object comprise
a condition relating to a relative relationship of at least one of position, speed, acceleration and orientation to be satisfied by the first moving body with respect to the other object.

3. The communication control apparatus according to claim 1, wherein
the constraint condition relating to a relative relationship between the first moving body and the other object comprise
that the first moving body and the other object do not collide,
the at least one processor is further configured to execute the instructions to
predict a collision time with which a distance between the first moving body and the other object is less than or equal to a predetermined value based on a position of the first moving body and a position of the other object, and
calculate the execution deadline by using the collision time.

4. The communication control apparatus according to claim 1, wherein
the constraint condition relating to a relative relationship between the first moving body and the other object comprise
a condition that at least one of a difference in position, a difference in speed, a difference in acceleration and a difference in orientation between the first moving body and the second moving body is within a predetermined range, and
the at least one processor is further configured to execute the instructions to predict a time at which the condition to be satisfied between the first moving body and the second moving body is no longer satisfied.

5. The communication control apparatus according to claim 1, wherein the at least one processor is further configured to execute the instructions to calculate the execution deadline by using the violation time and a braking period or operating period of the first moving body.

6. The communication control apparatus according to claim 1, wherein the at least one processor is further configured to execute the instructions to predict a communication period required for communicating predetermined information between the first moving body and the communication control apparatus by using at least one of a measured value of a communication period, a communication speed, a communication error rate, radio quality, a radio resource usage rate and a data size between the first moving body and the communication control apparatus, and
calculate the execution deadline by using the violation time and the communication period.

7. The communication control apparatus according to claim 1, wherein the at least one processor is further configured to execute the instructions to evaluate a safety margin of radio resource to be used in the first moving body; and
control running of the first moving body in accordance with the safety margin.

8. A communication control method in a communication control apparatus, the method comprising:
communicating information to and from a first moving body;
predicting a violation time at which the first moving body violates a constraint condition relating to a relative relationship between the first moving body and another object by using positional information of the first moving body;
calculating an execution deadline of an avoidance operation for avoiding a violation of the constraint condition by using the violation time; and increasing a priority level of a communication with the first moving body as a time difference between a current time and the execution deadline decreases, wherein the constraint condition relating to the relative relationship between the first moving body and the other object comprises a condition relating the first moving body and a second moving body that executes a task in collaboration with the first moving body.

9. A non-transitory computer-readable medium storing a program causing a computer to:

communicate information to and from a first moving body;

predict a violation time at which the first moving body violates a constraint condition relating to a relative relationship between the first moving body and another object by using positional information of the first moving body;

calculate an execution deadline of an avoidance operation for avoiding a violation of the constraint condition by using the violation time; and increase a priority level of a communication with the first moving body as a time difference between a current time and the execution deadline decreases, wherein the constraint condition relating to the relative relationship between the first moving body and the other object comprises a condition relating the first moving body and a second moving body that executes a task in collaboration with the first moving body.

* * * * *